United States Patent
Kuwahara et al.

(10) Patent No.: US 9,849,833 B2
(45) Date of Patent: Dec. 26, 2017

(54) DRIVING ASSISTANCE SYSTEM

(71) Applicant: MAZDA MOTOR CORPORATION, Hiroshima (JP)

(72) Inventors: Junichiro Kuwahara, Hiroshima (JP); Hitomi Nakazato, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/398,259

(22) Filed: Jan. 4, 2017

(65) Prior Publication Data
US 2017/0203688 A1    Jul. 20, 2017

(30) Foreign Application Priority Data

Jan. 14, 2016  (JP) ................... 2016-004959

(51) Int. Cl.
| | |
|---|---|
| G08B 23/00 | (2006.01) |
| B60Q 9/00 | (2006.01) |
| G06N 5/04 | (2006.01) |
| G06N 99/00 | (2010.01) |

(52) U.S. Cl.
CPC .......... B60Q 9/00 (2013.01); G06N 5/048 (2013.01); G06N 99/005 (2013.01)

(58) Field of Classification Search
CPC ......... B60Q 9/00; G06N 5/048; G06N 99/005
See application file for complete search history.

(56) References Cited

U.S. PATENT DOCUMENTS

| | | | | |
|---|---|---|---|---|
| 2012/0224060 A1* | 9/2012 | Gurevich | ................ | B60R 1/00 348/148 |
| 2013/0278405 A1* | 10/2013 | Bacal | .................... | H04K 3/415 340/439 |
| 2014/0139655 A1* | 5/2014 | Mimar | ............... | G08B 21/0476 348/77 |
| 2015/0091740 A1* | 4/2015 | Bai | ........................ | G08B 21/06 340/901 |
| 2016/0046298 A1* | 2/2016 | DeRuyck | ............. | B60W 40/09 340/576 |
| 2016/0101784 A1* | 4/2016 | Olson | .................. | B60W 40/08 340/576 |
| 2016/0267335 A1* | 9/2016 | Hampiholi | ............. | G06F 3/013 |

FOREIGN PATENT DOCUMENTS

| | | |
|---|---|---|
| JP | H06-255519 A | 9/1994 |
| JP | H07-069233 A | 3/1995 |

\* cited by examiner

*Primary Examiner* — Erin File
(74) *Attorney, Agent, or Firm* — Studebaker & Brackett PC (57) ABSTRACT

When finding the driver distracted from driving (such as looking aside), this system first alerts him or her to the fact to prompt him or her to focus on driving. However, if the driver is still distracted from driving even when alerted, driving assistance are provided for him or her to enhance his or her motivation to drive by encouraging him or her to drive actively and thereby increase his or her internal focus on driving. Examples of specific driving assistance include giving exemplary driving instructions to the driver, providing him or her with navigation to a road with features that would entertain him or her through driving, and improving sensitivity to any change in the vehicle's state responsive to driving operations.

3 Claims, 9 Drawing Sheets

| | DRIVER'S CONDITION | | | |
|---|---|---|---|---|
| | TENSED (HIGHLY FOCUSED EXTERNALLY) | IDEAL (HIGHLY FOCUSED INTERNALLY) | SELF-DRIVING, AIMLESS (WITH MUCH LEEWAY) | DISTRACTED [INATTENTIVE] (HIGHLY DIVERTED FROM DRIVING) |
| FACE ORIENTATION OFFSET | SMALL | SMALL | SMALL | LARGE |
| OPERATION OF NAVIGATION SYSTEM, CELLPHONE AND OTHER DEVICES — FREQUENCY | LOW | LOW | LOW | HIGH |
| OPERATION OF NAVIGATION SYSTEM, CELLPHONE AND OTHER DEVICES — DURATION | SHORT | SHORT | SHORT | LONG |
| EYE MOVEMENT VELOCITY | HIGH | HIGH | LOW | — |
| A/B PEDAL SWITCHING DELAY | SHORT | SHORT | LONG | — |
| HEAD TURN | LITTLE | LITTLE | MUCH | — |
| BLINKING | LITTLE | LITTLE | MUCH | — |
| PUPIL STATE | WIDE | WIDE | NARROW | — |
| AGREEMENT BETWEEN EYE DIRECTION AND HEAD ORIENTATION | LOW | HIGH | LOW | — |
| SAME ACCELERATOR POSITION HELD | SHORT | LONG | SHORT | — |
| A/B PEDAL SWITCHING TIME (DEVIATION) | LARGE | SMALL | LARGE | — |

DRIVING ASSISTANCE SYSTEM

CROSS-REFERENCE TO RELATED APPLICATION

This application claims priority to Japanese Patent Application No. 2016-004959 filed on Jan. 14, 2016, the entire disclosure of which is hereby incorporated by reference.

BACKGROUND

The present disclosure relates to a driving assistance system.

Recently, an increasing number of vehicles are equipped with various driving assistance capabilities, examples of which include automatic lane keeping control, automatic braking control, and adaptive auto-cruise control that have already been installed in a lot of vehicles on the market. For example, Japanese Unexamined Patent Publication No. H06-255519 discloses a driving assistance technique for relaxing the driver's attention to the surrounding environment in order to relieve his or her tension. Japanese Unexamined Patent Publication No. H07-069233 discloses a driving assistance technique for alleviating the driver's muscle tone during driving with the intervention of a control program.

Generally speaking, the driver should not do distracted driving (e.g., looking aside or talking over the cellphone while driving his or her vehicle) because it is unbeneficial from the safety considerations. Thus, it is possible to draw such a distracted driver's attention with an alert. However, even if he or she is alerted to the fact, he or she may still continue such distracted driving or may soon resume doing it after having suspended it just temporarily. For this reason, there is an increasing demand for some effective measure for discouraging such distracted driving.

SUMMARY

The present disclosure provides a driving assistance system for preventing, or at least discouraging, such distracted driving.

Specifically, a driving assistance system according to the present disclosure includes:

a distracted driving sensing unit configured to determine whether or not a driver is distracted from driving;

an alerting unit configured to alert, if the distracted driving sensing unit has determined the driver to be distracted from driving, him or her to the fact of distracted driving; and a driving assistance unit configured to provide, if the driver is still distracted from driving even when alerted by the alerting unit, driving assistance that enhances his or her motivation to drive by encouraging him or her to drive actively and thereby increase his or her internal focus on driving.

If the driver is distracted from driving, this configuration first alerts him or her to the fact of distracted driving, thereby increasing his or her tension and prompting him or her to focus on driving more intensively. Also, if the driver is still distracted from driving even when alerted, this configuration provides driving assistance that enhances his or her motivation to drive by encouraging him or her to drive actively and increase his or her internal focus on driving. This may prevent, or at least discourage, the driver from doing distracted driving, and eventually helps him or her improve his or her driving skills advantageously. Furthermore, even though the driver often stops distracted driving once alerted, it is not until he or she is alerted that the driving assistance is provided for him or her. This results in providing only minimum required driving assistance. This is beneficial because providing the driving assistance is a heavy load on the control system. It is not impossible to continue alerting the driver, without providing any driving assistance to increase his or her internal focus, in order to stop him or her from doing distracted driving. This is not beneficial because the driver would find the alert annoying in that case.

This basic idea of the present disclosure may be implemented as the following exemplary embodiments:

In one exemplary embodiment, the driving assistance system further includes:

a driver's condition detecting unit configured to detect the driver's condition;

a vehicle operating state detecting unit configured to detect the driver's vehicle operating state; and an equipment operating state detecting unit configured to detect the driver's operating state of onboard equipment irrelevant to his or her vehicle driving operations.

The distracted driving sensing unit uses, based on results of detection obtained by the respective detecting units, the driver's degree of focus on driving and his or her degree of leeway in driving as parameters, and determines the driver to be distracted from driving if his or her degree of focus on driving is low, his or her degree of leeway in driving is low, and his or her degree of distraction from driving has increased.

According to this embodiment, the driver's condition may be determined based on his or her degree of focus on driving and his or her degree of leeway in driving, and a determination may be made highly accurately, based on this decision, how much he or she is distracted from driving. This effectively prevents, or at least discourages, him or her from doing distracted driving.

In another exemplary embodiment, the driving assistance system further includes a classification unit configured to classify, based on results of detection obtained by the respective detecting units, the driver's condition as any of a plurality of types using, as parameters, his or her degree of focus on driving and his or her degree of leeway in driving.

The classification unit classifies the driver's condition as:

a first type if his or her degree of focus on driving is low, his or her degree of leeway in driving is low, and his or her degree of distraction from driving is high;

a second type if his or her degree of focus on driving is low and his or her degree of leeway in driving is high;

a third type if his or her degree of focus on driving is high, his or her degree of leeway in driving is low, and his or her degree of external focus on driving has been increased by some external factors; or a fourth type if his or her degree of focus on driving is high, his or her degree of leeway in driving is high, and his or her degree of internal focus on driving is high, and if the classification unit classifies the driver's condition as the first type, the distracted driving sensing unit determines the driver to be distracted from driving.

According to this embodiment, the driver's condition is classified as any of these four types by using, as parameters, his or her degree of focus on driving and his or her degree of leeway in driving, thereby highly accurately determining that the driver is distracted from driving. This may effectively prevent, or at least discourage, him or her from doing distracted driving.

In still another exemplary embodiment, the driving assistance system further includes:

a degree of internal focus measuring unit configured to measure the degree of internal focus of the driver who is driving actively;

a degree of external focus measuring unit configured to measure the degree of external focus of the driver who is driving passively;

a degree of distraction measuring unit configured to measure the driver's degree of distraction from driving operations; and a degree of spare capacity measuring unit configured to measure the degree of spare capacity indicating the driver's degree of loss of focus.

The classification unit classifies, based on results of detection obtained by these four measuring units, the driver's condition as any of the various types.

According to this embodiment, the driver's condition may be classified highly accurately as any of the four types by measuring the respective degrees of focus, the degree of distraction and the degree of spare capacity. This effectively prevents, or at least discourages, him or her from doing distracted driving.

In yet another exemplary embodiment, the classification unit classifies the driver's condition as any of the various types by regarding the degree of internal focus and the degree of spare capacity as values indicating the driver's degree of leeway and also regarding the degrees of internal and external foci as values indicating the driver's degrees of focus.

According to this embodiment, the driver's condition may be classified highly accurately as any of the four types by appropriately setting the degrees of focus on driving and the degree of leeway in driving.

In yet another exemplary embodiment, the driver's condition detecting unit includes an image capturing unit configured to capture an image covering at least the driver's face, and the vehicle operating state detecting unit includes at least two sensors configured to detect respective operating states of an accelerator pedal and a brake pedal.

According to this embodiment, the respective degrees of focus, the degree of distraction, and the degree of spare capacity may be measured highly accurately by means of general electronic devices.

In yet another exemplary embodiment, the driving assistance includes giving exemplary driving instructions to the driver.

This sufficiently enhances the driver's motivation to drive and effectively improves his or her driving skills while preventing him or her from doing distracted driving.

In yet another exemplary embodiment, the driving assistance includes providing the driver with navigation to a road with features that would entertain him or her through driving.

This sufficiently enhances the driver's motivation to drive and highly effectively prevents him or her from doing distracted driving.

In yet another exemplary embodiment, the driving assistance includes improving sensitivity to any change in the vehicle's state responsive to driving operations.

This sufficiently enhances the driver's motivation to drive and highly effectively prevents, or at least discourages, him or her from doing distracted driving.

DETAILED DESCRIPTION

Exemplary embodiments will now be described in detail with reference to the accompanying drawings.

Figure 1:
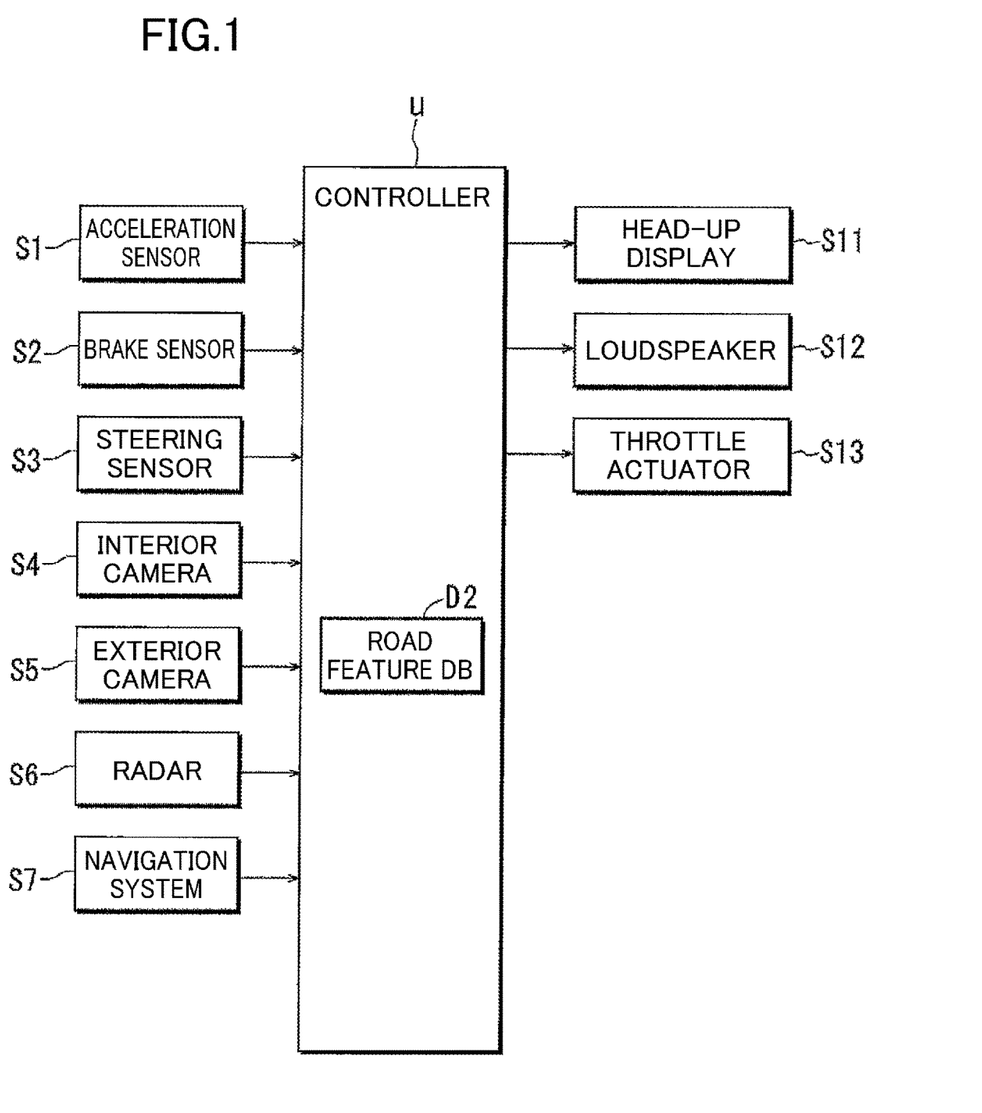
FIG. 1 is a block diagram illustrating an exemplary control system according to an embodiment.

FIG. 1 illustrates an exemplary control system according to an embodiment. As shown in FIG. 1, a controller (control unit) U implemented as a microcomputer receives signals from various sensors and devices S1-S7 installed in a vehicle such as an automobile. Specifically, an acceleration sensor S1 is provided to detect the vehicle's accelerator position. A brake sensor S2 is provided to detect how far the vehicle's brake pedal is depressed (hereinafter referred to as a "degree of depression of the brake pedal"). A steering sensor S3 is provided to detect the steering angle. An interior camera S4 functioning as an image capture unit is provided to capture an image of the driver's face. An exterior camera S5 is provided to monitor the situation outside of the vehicle (e.g., the situation in front of his or her own vehicle, in particular). A radar S6 is provided to measure the distance to an obstacle in front of the vehicle, for example A navigation system S7 is provided to get map information and information about the vehicle's current location.

The controller U controls the various devices S11-S13 for the purpose of providing driving assistance to be described later. Specifically, a head-up display S11 is provided in front of the driver's seat. A loudspeaker S12, functioning as an alerting unit, is provided to emit a sound inside the vehicle cabin. A throttle actuator S13 is provided to allow the driver to adjust the throttle characteristic (specifically, adjust the throttle opening with respect to the accelerator position).

To provide various types of driving assistance to be described later, the controller U includes a database (DB) D2. This database D2 is actually implemented as an externally connected storage device with large storage capacity. Specifically, the database D2 stores information about the features of a road that entertained the driver.

Figure 2:
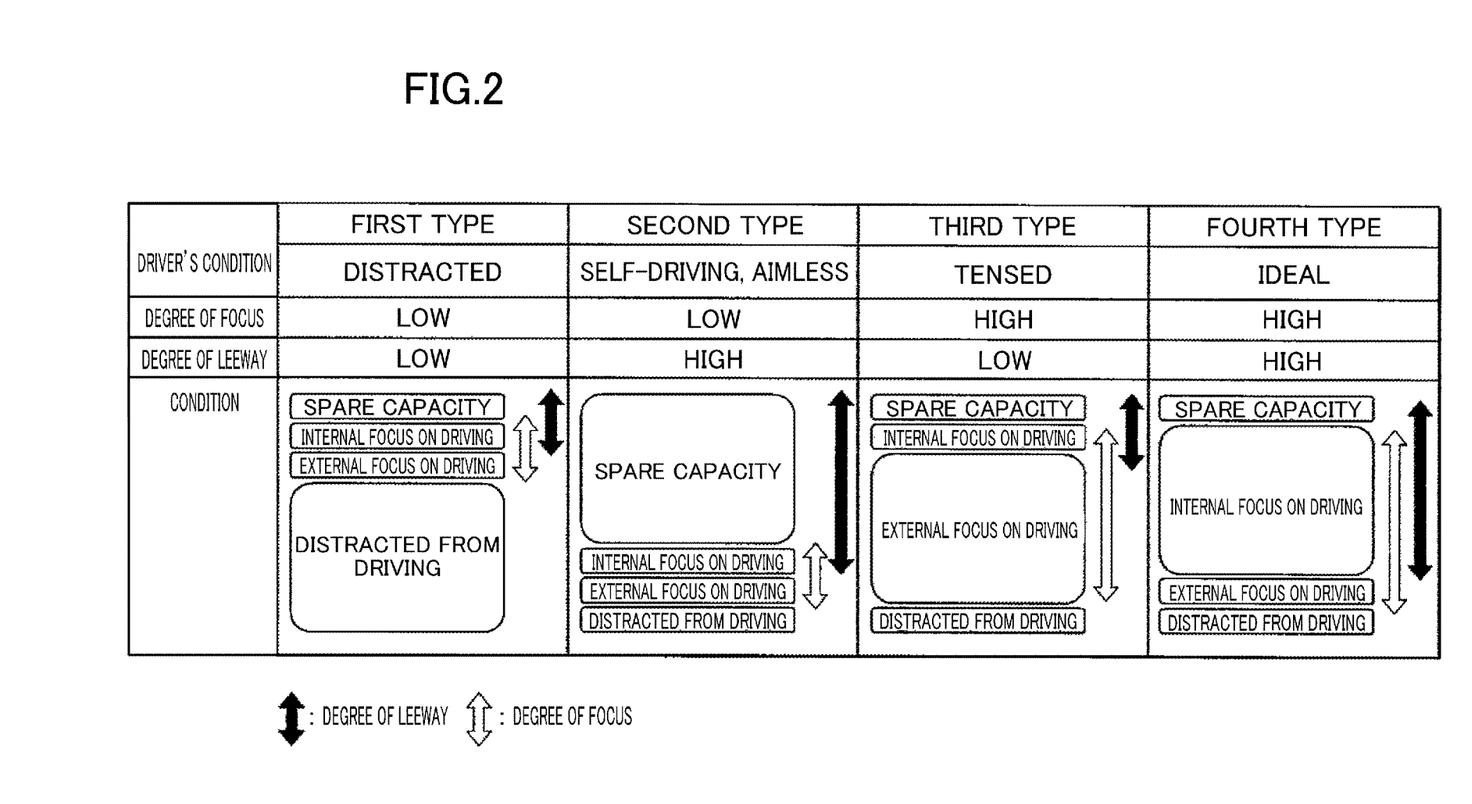
FIG. 2 is a table summarizing the details of four different types of driver's condition.

Next, it will be described with reference to FIG. 2 how to classify the driver's condition as any of four types. First of all, the driver's degrees of focus on driving and his or her degree of leeway in driving will be described as a premise of this type classification.

The focus on driving may be represented, depending on the driver's behavioral pattern, by any of the four different degrees, which will be hereinafter referred to as first, second, third, and fourth degrees, respectively, for convenience sake. Specifically, the first degree represents an external (passive) focus on driving, i.e., a situation where the driver is forced to perform driving operations against his or her will, and is less motivated to drive, due to some external factors. The second degree represents an internal (active) focus on driving, i.e., an ideal situation where the driver is driving his or her vehicle at his or her own will and is highly motivated to drive. The third degree represents the driver's distraction from driving (such as operating the touchscreen of the navigation system or talking over his or her cellphone). The fourth degree represents the driver's loss of focus (which is defined to be a redundancy that is an unused, reserved portion of his or her maximum focusing ability and will be hereinafter referred to as a "spare capacity" in the following description and drawings).

Supposing the sum of these four degrees of focus is 100%, the degree of focus on driving is the percentage accounted for by the sum of the external and internal foci, and the driver's degree of leeway in driving is the percentage accounted for by the sum of the internal focus and the spare capacity. The following first, second, third, and fourth types are defined as the four types.

Specifically, the driver's condition is classified as the first type if his or her degree of focus on driving is low and his or her degree of leeway in driving is low (particularly when the driver is doing distracted driving (e.g., looking aside while driving his or her vehicle)). The driver's condition is classified as the second type if his or her degree of focus on driving is low and his or her degree of leeway in driving is high (e.g., when his or her vehicle is self-driving or when he or she is doing aimless driving). The driver's condition is classified as the third type if his or her degree of focus on driving is high and his or her degree of leeway in driving is low. The driver in this third type of condition is found tensed, for example, when the following vehicle is running close behind his or her vehicle. The driver's condition is classified as the fourth type if his or her degree of focus on driving is high and his or her degree of leeway in driving is high. This is an ideal driving condition. If the driver is distracted from driving, his or her condition is classified as the first type.

Figure 3:
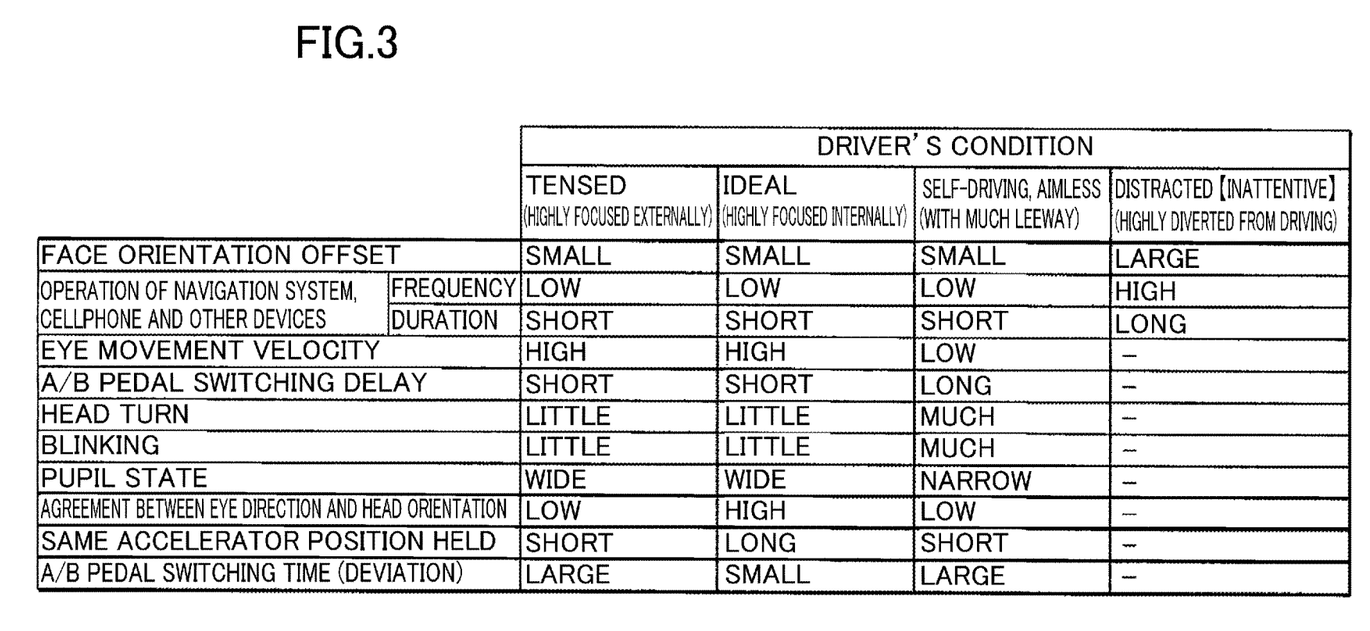
FIG. 3 is a table summarizing how the driver's condition is determined to be one of the four different types based on various parameters.

FIG. 3 is a table summarizing how the driver's condition, including the degrees of external and internal foci, the degree of distraction from driving, and the degree of spare capacity, is determined based on various parameters. Examples of such parameters include the driver's physical features extracted from the image captured by the interior camera S4 such as his or her facial expressions, eye direction, and pupil state and how the accelerator pedal (A pedal) and brake pedal (B pedal) are operated. The driver's current condition is determined to be any of the four types based on these results of detection integrated together.

When determining the driver's condition to be the first type (i.e., when finding him or her distracted from driving), the controller U alerts him or her to the fact first. However, if the driver still continues such distracted driving, or soon resumes doing it after having temporarily suspended it once, even when alerted, then the controller U provides driving assistance for him or her to increase his or her internal focus through the driving assistance. An exemplary procedure of control to be performed by the controller U will be described with reference to the flowcharts of FIGS. 4 through 7. In the following description, the reference sign Q denotes a processing step.

First of all, in Q1 shown in FIG. 4, the controller U determines the driver's condition as will be described later. In this processing step Q1, the controller U determines which of the four types the driver's current condition falls under. Next, in Q2, the controller U determines whether or not the driver is distracted from driving, i.e., whether or not the driver's current condition falls under the first type. If the answer to the question of Q2 is NO, then no driving assistance is needed at this time, and the process goes back to Q1.

On the other hand, if the answer to the question of Q2 is YES, then the loudspeaker S12 emits, in Q3, an alarm sound prompting the driver to focus his or her attention on driving.

Instead of, or in addition to, the alarm sound emitted from the loudspeaker S12, an alert message may also be displayed on the head-up display S11 in order to alert him or her to the fact of distracted or inattentive driving.

After having performed the processing step Q3, the controller U counts, in the next processing step Q4, the number of times K the driver has looked aside, or been distracted from driving, during a specified amount of time (which will be hereinafter referred to as "distracted driving"). In this embodiment, this processing step Q4 of sensing the frequency of occurrence of distracted driving is carried out independently of the type classification described above. Specifically, the controller U senses the distracted driving by detecting the driver's face orientation or eye direction based on an image captured by the interior camera S4 or by detecting how many times or how long the driver has operated onboard equipment other than the vehicle's steering wheel, pedals, and so on during the specified amount of time. Optionally, the result of the type classification described above may also be relied on.

After having performed the processing step Q4, the controller U determines, in the next processing step Q5, whether or not the number of times K counted in the previous processing step Q4 is equal to or greater than a predetermined value. If the answer to the question of this processing step Q5 is NO, then a determination is made that the driver has stopped the distracted driving and the process returns with the next processing step Q6 skipped. On the other hand, if the answer to the question of this processing step Q5 is YES, then the controller U provides, in the next processing step Q6, driving assistance to increase his or her internal focus on driving and discourage him or her from doing such distracted driving. This processing step Q6 will be described in detail later.

Figure 4:
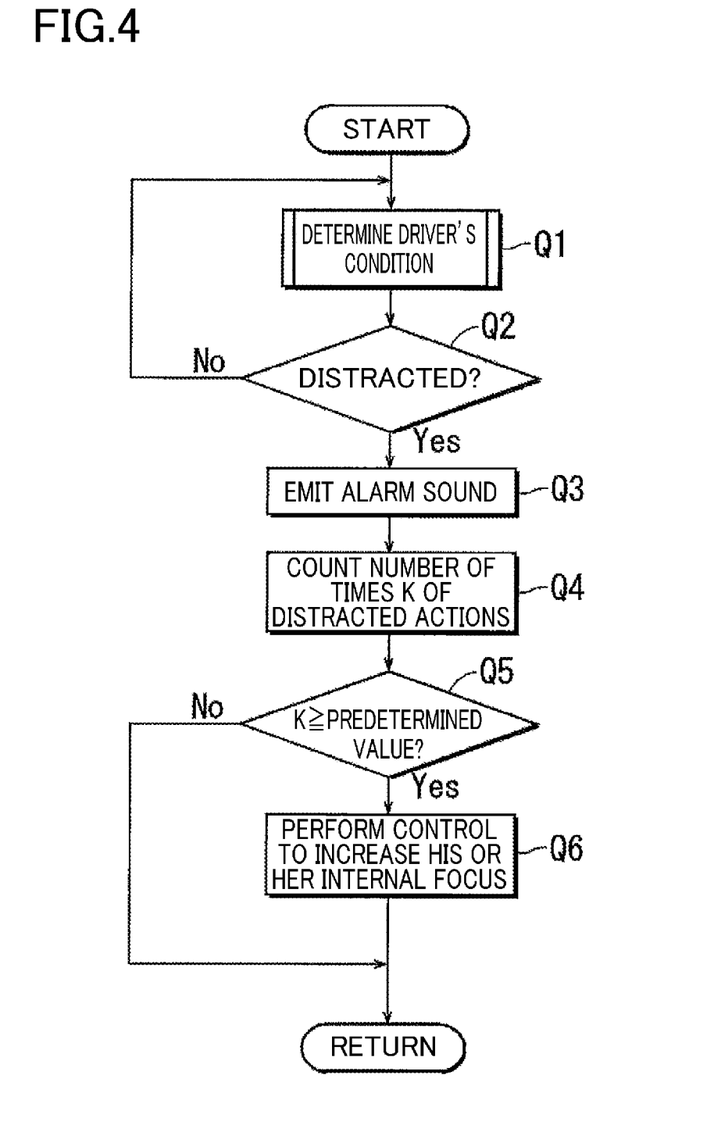
FIG. 4 is a flowchart illustrating an exemplary procedure of control according to an embodiment.
Figure 5:
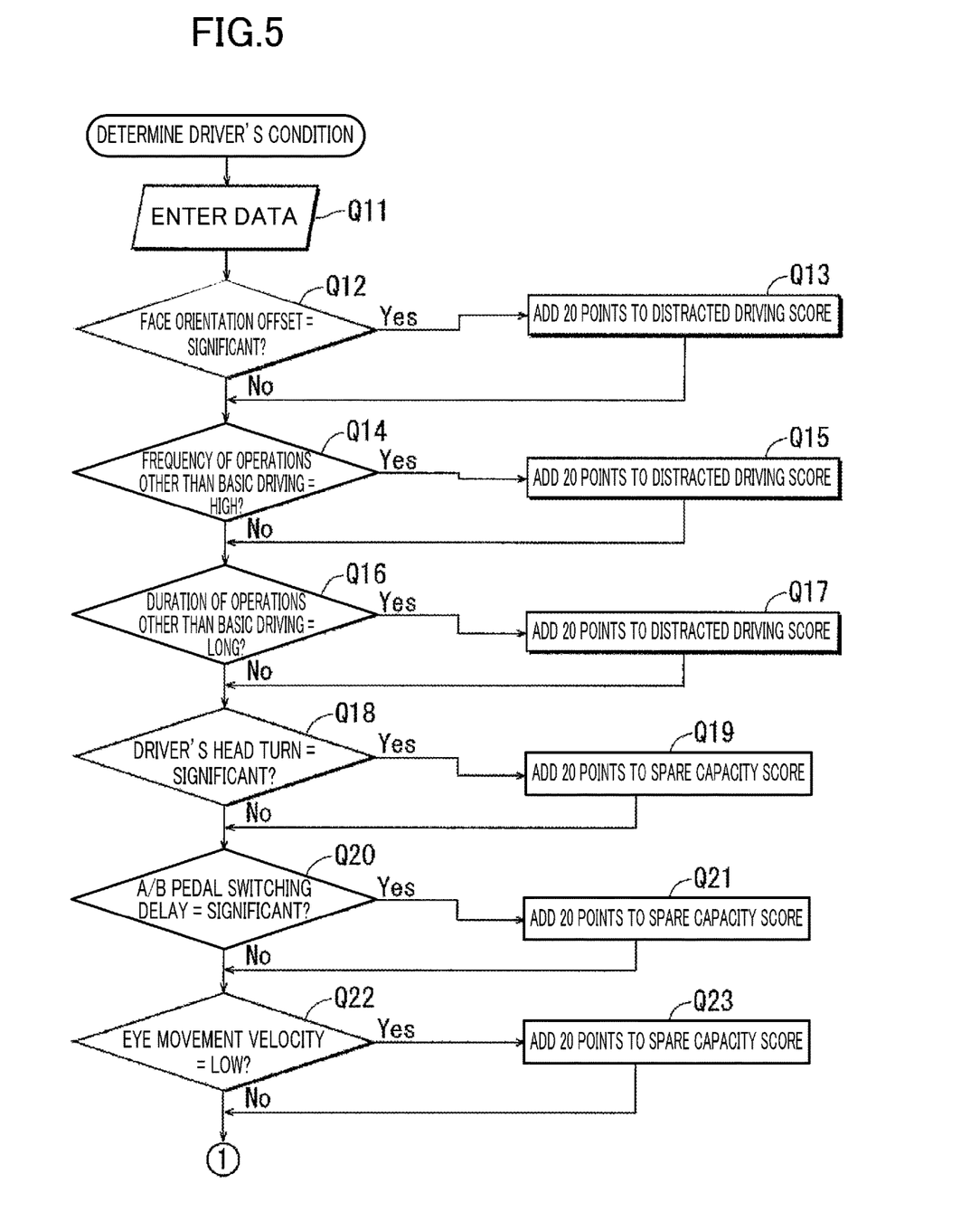
FIGS. 5-7 are a flowchart illustrating a detailed procedure of the driver's condition determination step Q1 shown in FIG. 4.

FIGS. 5-7 show the details of the processing step Q1 shown in FIG. 4. Specifically, after data has been entered in Q11 shown in FIG. 5, the controller U determines in Q12 whether or not the driver's face orientation has a significant offset (i.e., whether or not he or she is looking aside while driving). If the answer to the question of this processing step Q12 is YES, then a predetermined number of points (e.g., 20 points) are added to a distracted driving score in Q13.

After the controller U has performed the processing step Q13 or if the answer to the question of Q12 is NO, the controller U determines in Q14 whether or not the driver is frequently performing operations other than basic driving operations (i.e., pumping the accelerator and brake pedals, turning the steering wheel, and other driving operations to change the vehicle's behavior). More specifically, the controller U determines whether or not the frequency of occurrence of such non-basic operations is equal to or greater than a predetermined threshold value. If the answer to the question of this processing step Q14 is YES, then a predetermined number of points (e.g., 20 points) are added to the distracted driving score in Q15.

After the controller U has performed the processing step Q15 or if the answer to the question of Q14 is NO, the controller U determines in Q16 whether or not the duration of those other operations performed by the driver is significantly long compared to that of the basic driving operations. More specifically, the controller U determines whether or not the duration is equal to or greater than a predetermined threshold value. If the answer to the question of this processing step Q16 is YES, then a predetermined number of points (e.g., 20 points) are added to the distracted driving score in Q17.

After the controller U has performed the processing step Q17 or if the answer to the question of Q16 is NO, the controller U determines in Q18 whether or not the driver's head turn is significant. More specifically, the controller U determines whether or not his or her head turn is equal to or greater than a predetermined threshold value. If the answer to the question of this processing step Q18 is YES, then a predetermined number of points (e.g., 20 points) are added to a spare capacity score in Q19.

After the controller U has performed the processing step Q19 or if the answer to the question of Q18 is NO, the controller U determines in Q20 whether or not a significant delay has been caused by the driver in changing the pedals to pump from the accelerator pedal to the brake pedal, and vice versa. More specifically, the controller U determines whether or not the delay is equal to or greater than a predetermined threshold value. If the answer to the question of this processing step Q20 is YES, then a predetermined number of points (e.g., 20 points) are added to the spare capacity score in Q21.

After the controller U has performed the processing step Q21 or if the answer to the question of Q20 is NO, the controller U determines in Q22 whether or not the driver's eye movement velocity is low. More specifically, the controller U determines whether or not the eye movement velocity is equal to or smaller than a predetermined threshold value. If the answer to the question of this processing step Q22 is YES, then a predetermined number of points (e.g., 20 points) are added to the spare capacity score in Q23.

Figure 6:
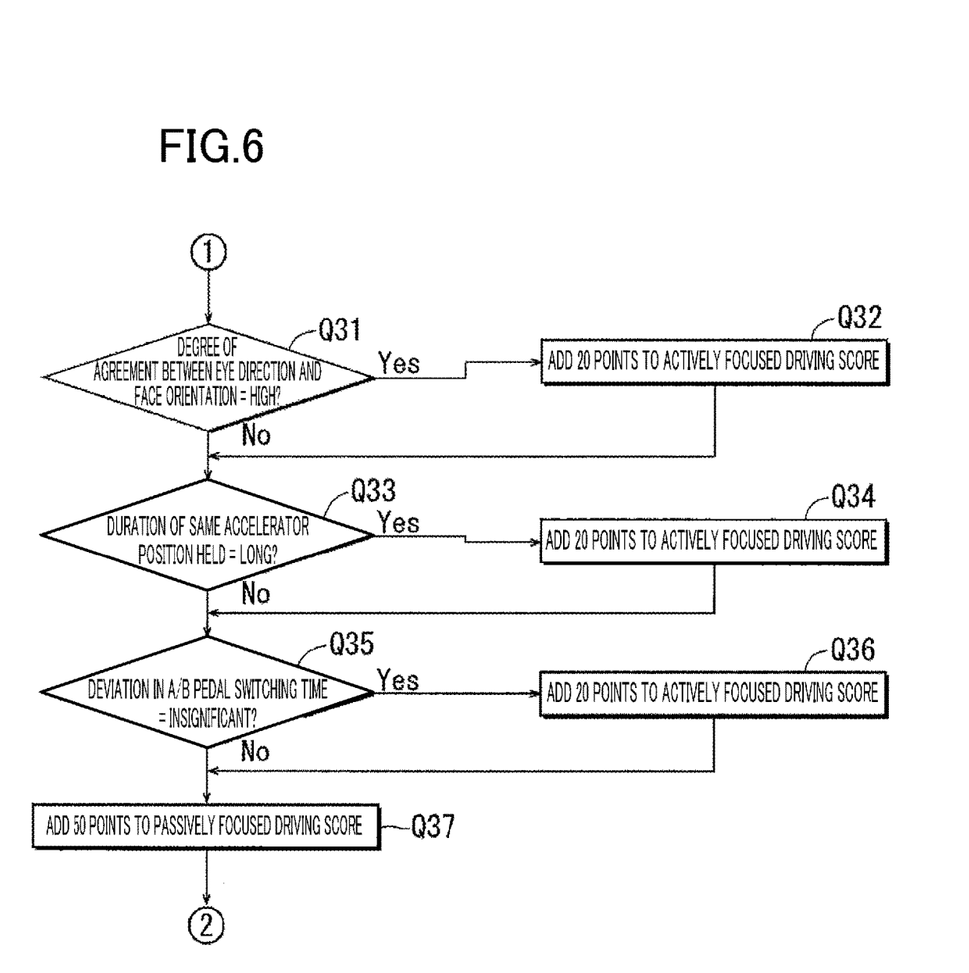

After the controller U has performed the processing step Q23 or if the answer to the question of Q22 is NO, the controller U determines in Q31 shown in FIG. 6 whether or not the degree of agreement between the driver's face orientation and his or her eye direction is high. More specifically, the controller U determines whether or not the degree of agreement falls within a predetermined threshold range. If the answer to the question of this processing step Q31 is YES, then a predetermined number of points (e.g., 20 points) are added to an actively (internally) focused driving score in Q32.

After the controller U has performed the processing step Q32 or if the answer to the question of Q31 is NO, the controller U determines in Q33 whether or not the same accelerator position has been held for a significant amount of time. More specifically, the controller U determines whether or not the amount of time is equal to or greater than a predetermined threshold value. If the answer to the question of this processing step Q33 is YES, then a predetermined number of points (e.g., 20 points) are added to the actively (internally) focused driving score in Q34.

After the controller U has performed the processing step Q34 or if the answer to the question of Q33 is NO, the controller U determines in Q35 whether or not the deviation (i.e., the standard deviation) in the amount of time it takes for the driver to change pedals to pump from the accelerator pedal to the brake pedal, and vice versa, is insignificant. More specifically, the controller U determines whether or not the standard deviation is equal to or smaller than a predetermined threshold value. If the answer to the question of this processing step Q35 is YES, then a predetermined number of points (e.g., 20 points) are added to the actively (internally) focused driving score in Q36.

If the answer to the question of Q35 is NO, then a predetermined number of points (e.g., 50 points) are added to a passively (externally) focused driving score in Q37.

Figure 7:
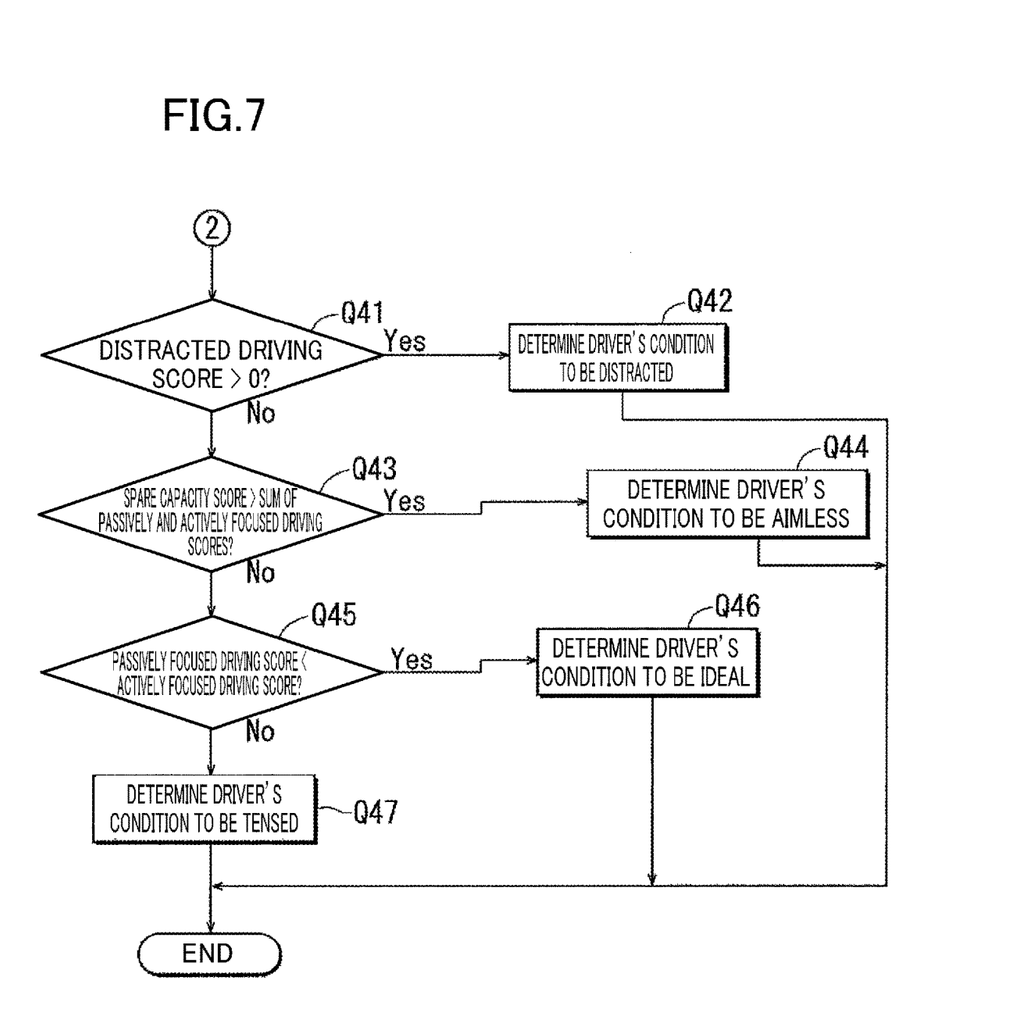

After having performed the processing step Q37, the controller U determines in Q41 shown in FIG. 7 whether or not the (total) distracted driving score is greater than 0 points. If the answer to the question of this processing step Q41 is YES, then the controller U determines in Q42 that the driver is doing distracted driving (e.g., looking aside while driving), i.e., the driver's current condition falls under the first type.

On the other hand, if the answer to the question of the processing step Q41 is NO, then the controller U determines in Q43 whether or not the (total) spare capacity score is greater than the sum of the (total) passively focused driving score and the (total) actively focused driving score. If the answer to the question of this processing step Q43 is YES, then the controller U determines in Q44 that the driver is doing aimless driving, i.e., the driver's current condition falls under the second type.

On the other hand, if the answer to the question of the processing step Q43 is NO, then the controller U determines in Q45 whether or not the (total) actively focused driving score is greater than the (total) passively focused driving score. If the answer to the question of this processing step Q45 is YES, then the controller U determines in Q46 that the driver is in an ideal condition, i.e., the driver's current condition falls under the fourth type. On the other hand, if the answer to the question of this processing step Q45 is NO, then the controller U determines in Q47 that the driver is in a tense condition, i.e., the driver's current condition falls under the third type.

Figure 8:
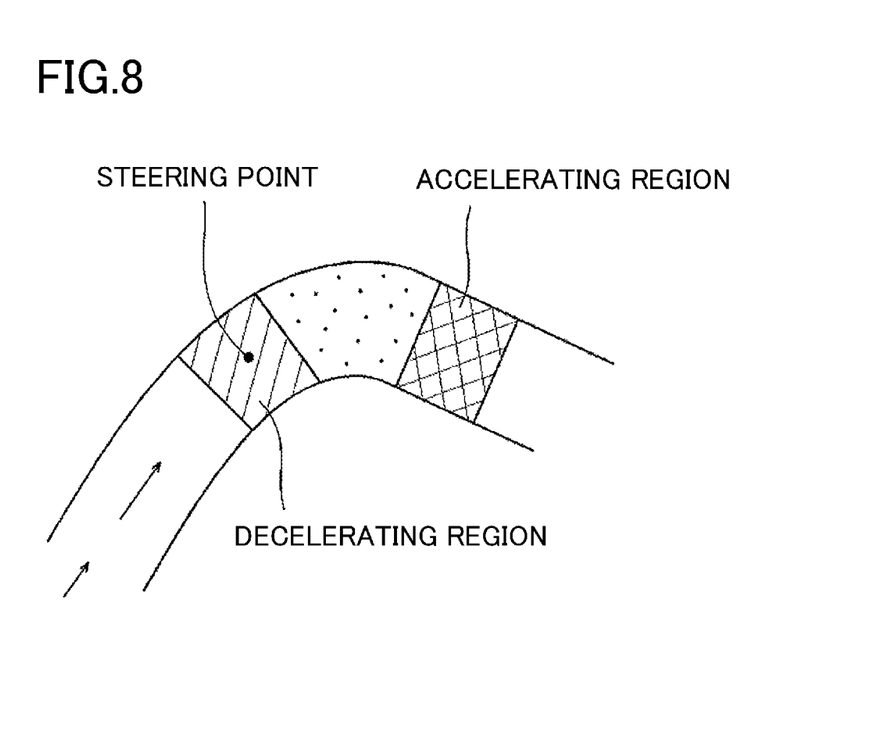
FIG. 8 diagrammatically illustrates exemplary control for enhancing the driver's motivation to drive according to an embodiment.

Next, an exemplary technique for increasing the driver's internal focus on driving in Q6 shown in FIG. 4 will be described with reference to FIGS. 8-10. Specifically, FIG. 8 illustrates an embodiment in which exemplary driving instructions are displayed on the screen to the driver. For example, while the driver is making cornering, not only an accelerating region and a decelerating region (in two different colors, for example) but also a steering point indicating a steering start timing (in a flickering state, for example) may be highlighted on the road image displayed. This enhances the driver's motivation to drive and improves his or her driving skills. Although an exemplary cornering technique is illustrated in FIG. 8, any other appropriate set of exemplary driving instructions may also be displayed as an ideal example to follow, which may be a set of exemplary driving operations to perform on a highway or a set of exemplary parking operations, depending on the real-time situation on the road. Among other things, it is particularly beneficial to display a steering timing and timings to depress the accelerator and brake pedals as examples to follow. Optionally, the driver may be notified of these timings through audio guidance.

Figure 9:
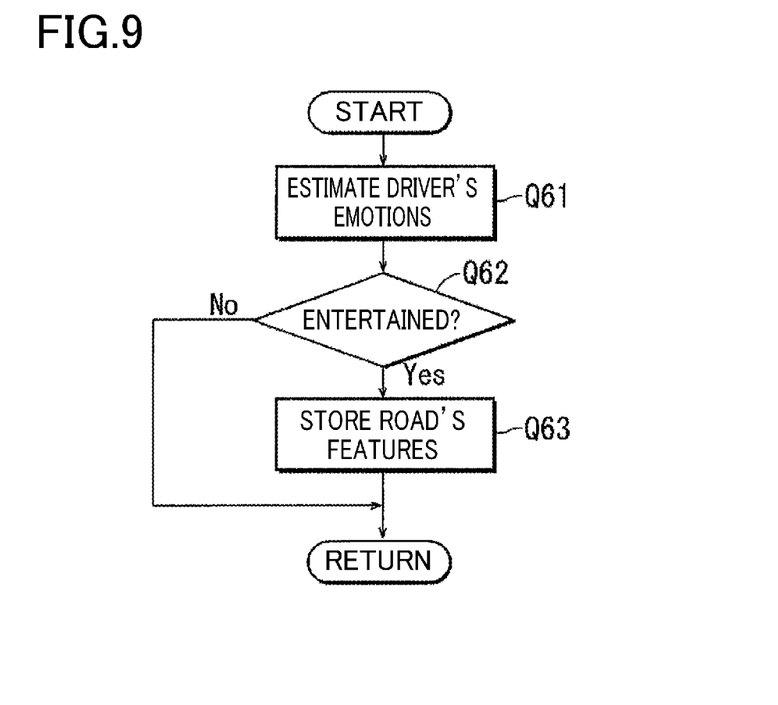
FIG. 9 is a flowchart illustrating an exemplary procedure of control for storing the features of a road that entertained the driver according to an embodiment.

FIG. 9 shows an exemplary procedure of control to be performed to provide the driver with navigation to a road with features that would entertain him or her. Specifically, in Q61, the controller U estimates the driver's emotions based on his or her facial expressions captured by the interior camera S4, for example. Next, in Q62, the controller U determines, based on the results of estimation obtained in Q61, whether or not the driver is enjoying driving, i.e., entertained by the features of the road. If the answer to the question of this processing step Q62 is YES, the features of the road entertaining him or her are stored in the database D2. On the other hand, if the answer to the question of the processing step Q62 is NO, then the process returns with the processing step Q63 skipped. Then, in the processing step Q6 shown in FIG. 4, the controller U selects, from among a plurality of roads running in almost the same direction as the road currently taken, a road having the features stored in the database D2, and provides the driver with navigation to this selected road (e.g., by providing guidance on a navigation screen image).

Figure 10:
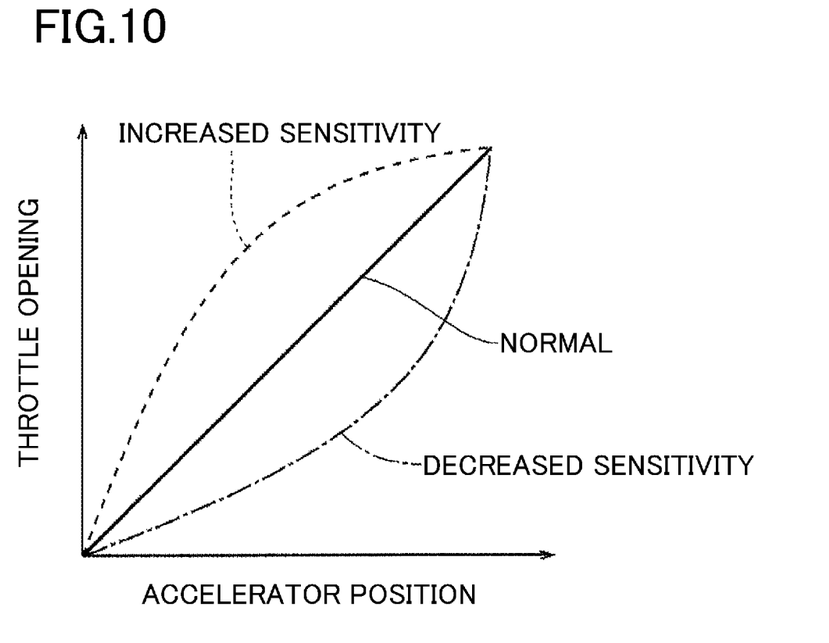
FIG. 10 diagrammatically illustrates how the throttle characteristics may be changed according to an embodiment.

FIG. 10 illustrates an exemplary technique for enhancing the driver's motivation to drive by increasing the sensitivity of an engine output to accelerating operations. In FIG. 10, the solid line represents a normal (ordinary) throttle characteristic. The broken curve represents a throttle characteristic with increased sensitivity (i.e., a characteristic that the throttle opening increases more significantly with respect to the same accelerator position than in the normal throttle characteristic). The one-dot-chain curve represents a throttle characteristic with decreased sensitivity (i.e., a characteristic that the throttle opening decreases more significantly with respect to the same accelerator position than in the normal throttle characteristic). In Q6 shown in FIG. 4, the throttle characteristic with the increased sensitivity as indicated by the broken curve in FIG. 10 is selected, and the throttle actuator S15 is controlled in accordance with this selected throttle characteristic. Optionally, any two or all three of the control procedures shown in FIGS. 8-10 may be performed.

Although some embodiments of the present disclosure have been described, they are just non-limiting exemplary embodiments of the present disclosure. Thus, those exemplary embodiments may be readily modified appropriately without departing from the scope of the present disclosure defined by the appended claims For example, the conditions for providing the driving assistance to increase the driver's internal focus on driving in Q6 shown in FIG. 4 may be any one condition or two selected from the group consisting of: whether the driver's physical condition is good or bad, whether or not there is any traffic jam, and whether the driver's driving skills are high or low. Alternatively, the driving assistance may also be provided under any other condition. A specific technique for providing the driving assistance to increase the driver's internal focus on driving may be not only any of the ones described in the foregoing description of embodiments but also any other appropriate one such as increasing the sensitivity of the steering wheel, outputting an engine sound (which may also be a fake engine sound) from the loudspeaker S12 and amplifying it in Q6 shown in FIG. 4, or reducing the operation reaction force of the accelerator or brake pedal or the steering wheel. Furthermore, the parameters used to classify the driver's condition as any of the four types shown in FIG. 2 may be only some of the ones shown in FIG. 3 or may further include any other appropriate parameter such as a one indicating a steering operation state. Furthermore, each of the processing steps or each series of processing steps shown in the flowcharts represents any of the functions of the controller U. Thus, any of these functions may also be embodied as a hardware component that forms part of the controller U if the step or the series of steps is implemented as a means or section for performing its/their intended function. Naturally, objects of the present disclosure include not only the explicitly specified ones but also others that are implicitly suggested herein as advantages or benefits of the present disclosure.

What is claimed is:

1. A driving assistance system comprising:
a driver's condition detecting unit configured to detect a driver's condition;
a vehicle operating state detecting unit configured to detect the driver's vehicle operating state;
a degree of focus measuring unit configured to determine, based on information detected by the driver's condition detecting unit and the vehicle operating state detecting unit, that the driver's degree of focus on driving is high if either the driver's eye movement velocity or pupil state is equal to or greater than a predetermined value or if any of a pedal switching delay involved with switching between an accelerator pedal and a brake pedal, a degree of a head turn, or a rate of blinking is equal to or smaller than a predetermined value;
a degree of leeway measuring unit configured to determine, based on the information detected by the driver's condition detecting unit and the vehicle operating state detecting unit, that the driver's degree of leeway is high if at least one of agreement between the driver's eye direction and head orientation or duration for which the same accelerator position is held is equal to or greater than a predetermined value;
a distracted driving sensing unit configured to determine that the driver is distracted from driving if the driver's degree of focus and degree of leeway are both low;
an alerting unit configured to alert, if the distracted driving sensing unit has determined the driver to be distracted from driving to the fact of distracted driving; and;
a controller provides driving assistance to bring the driver's attention back to the driving operations if the distracted driving sensing unit determines that the driver is still distracted from driving even after the driver has been alerted by the alerting unit to the fact of distracted driving.

2. The driving assistance system of claim 1, wherein
the controller controls a display or audio system equipped for the vehicle being driven by the driver so as to notify the driver of timings to operate the accelerator pedal, the brake pedal, and steering in accordance with features of a road in front of the driver.

3. The driving assistance system of claim 1, wherein
the controller controls actuators for onboard equipment so as to increase the magnitude of control over the vehicle's behavior corresponding to degrees of operations of the onboard equipment about a vehicle speed or a road to drive on, compared to a situation where the driver is not distracted from driving.

* * * * *